Aug. 6, 1929.  T. F. BARTON  1,723,911
SYSTEM OF ELECTRICAL DISTRIBUTION
Filed Nov. 15, 1927
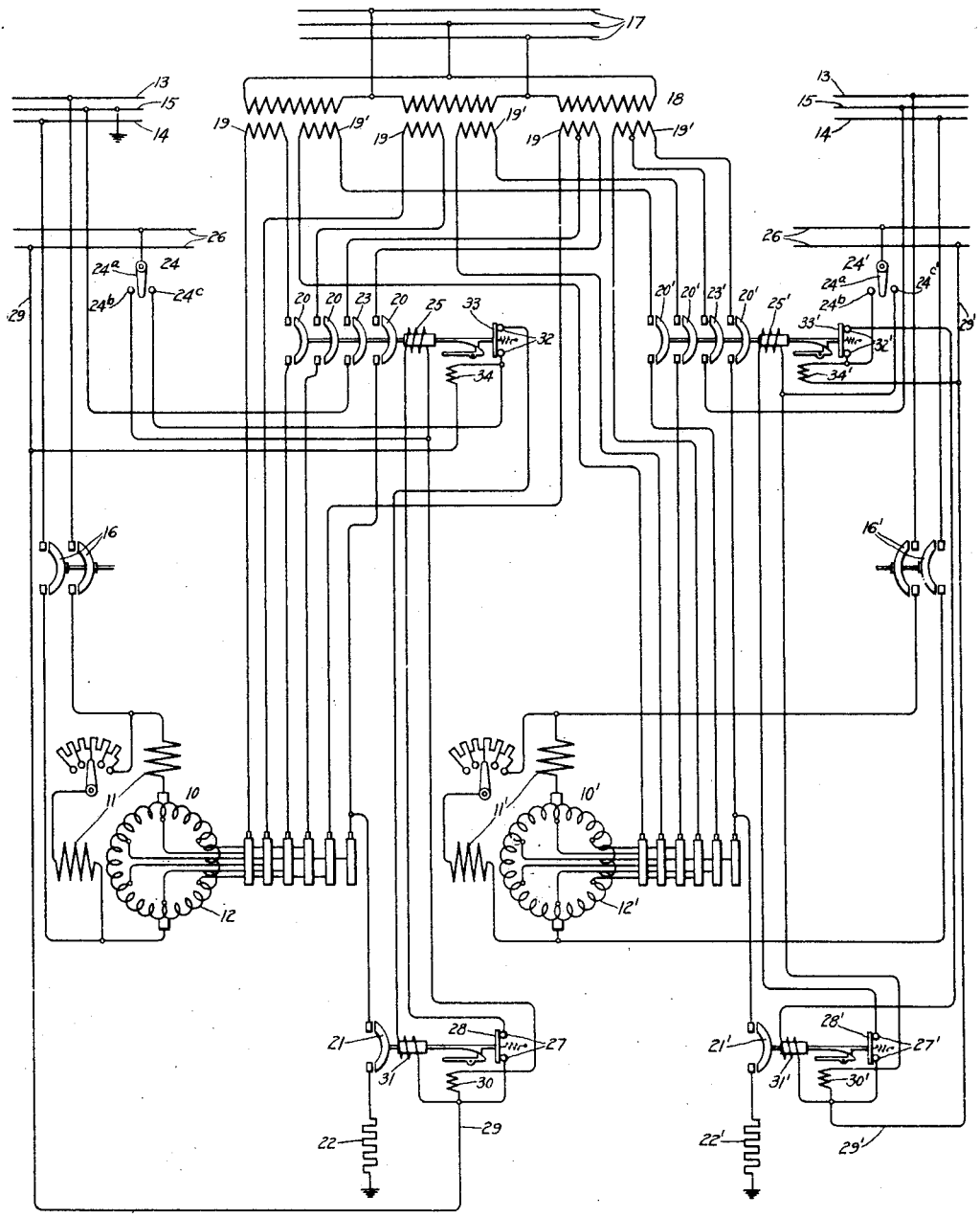
Inventor:
Theophilus F. Barton,
by *Alexander S. ____*
His Attorney.

Patented Aug. 6, 1929.

1,723,911

UNITED STATES PATENT OFFICE.

THEOPHILUS F. BARTON, OF UPPER MONTCLAIR, NEW JERSEY, ASSIGNOR TO GENERAL ELECTRIC COMPANY, A CORPORATION OF NEW YORK.

SYSTEM OF ELECTRICAL DISTRIBUTION.

Application filed November 15, 1927. Serial No. 233,498.

My invention relates to systems of electrical distribution and more particularly to an arrangement for reducing the number of main line circuit breakers required for controlling electrical apparatus connected thereto.

In systems of distribution it has generally been the practice to entirely disconnect apparatus from the line circuit for the reason that the winding of the apparatus is ordinarily ungrounded and if it were not entirely disconnected from the line circuit the voltage between the winding and ground may make it unsafe for persons inspecting the machine. For instance, in systems of distribution it is frequently desirable to employ a double secondary alternating current transformer having two dynamo-electric machines connected to the separate secondary windings of the transformer. When one only of these machines is being operated the flux linking the secondary passes through both of the separate secondary windings so that it has heretofore been necessary to entirely disconnect the other machine from the transformer, as the voltage to ground from its armature may be high enough to be dangerous to attendants working on the machine. In order to entirely disconnect the transformer from the idle machine it has been the practice to employ two circuit breakers between each separate secondary winding of the transformer and the armature of the idle machine.

The object of my invention is to provide an arrangement such that it is necessary only to open the circuit between the winding of the electrical apparatus and the system of distribution without entirely disconnecting the apparatus therefrom. I do this by providing means for grounding the winding of the electrical apparatus in response to opening the circuit between the winding and the system of distribution without entirely disconnecting the electrical apparatus therefrom. In the system mentioned above by way of example this is accomplished by providing an arrangement such that one terminal only of the transformer in each phase need be disconnected from the machine so that the number of main line circuit breakers required for each machine is half that formerly required. I do this by employing means in connection with each machine for grounding its armature winding independently of the other machine in response to opening the circuit between the secondary winding of the transformer and the winding of the machine.

My invention will be more fully set forth in the following description referring to the accompanying drawing and the features of novelty which characterize my invention will be set forth with particularity in the claims annexed to and forming a part of this specification.

In the drawing, the single figure diagrammatically illustrates my invention as applied to a system of electrical distribution including a double secondary alternating current transformer having each of the two separate windings of the secondary connected to a rotary converter independently or the other.

Referring to the drawing, the system of distribution, which I have shown as illustrative of my invention, comprises two pieces of electrical apparatus, such as six-phase rotary converters 10 and 10' provided with the usual field exciting windings 11 and 11' and armature windings 12 and 12' which are adapted to be connected to positive and negative main conductors 13 and 14 respectively of a three-wire direct current system having a grounded neutral conductor 15. The direct current side of the rotary converters 10 and 10' are adapted to be connected to these positive and negative main conductors of the direct current system by means including circuit breakers 16 and 16' which may be opened and closed in any suitable manner. Power is supplied to the rotary converters from an alternating current circuit 17 through a transformer 18 having a double secondary comprising separate windings or sections 19 and 19' which are insulated from each other. This transformer may be made up of three single-phase transformers, which are often employed in systems such as illustrated, or a single three-phase transformer may be employed.

In accordance with my invention one terminal of each of the secondary windings 19 is directly connected to the slip rings of the rotary converter 10 and the other terminal of each of these windings is connected to the slip rings of the rotary converter by circuit breakers 20. One terminal of each of the windings 19' is directly connected to the slip rings of the rotary converter 10' and each of the other terminals of these windings is connected to the slip rings of this converter by circuit breakers 20'. It will be noted that by connecting one terminal of each of the secondary windings 19 and 19' directly to the slip rings of the rotary converters 10 and 10' that in the particular arrangement shown three line circuit breakers only are required as compared with six employed in connecting machines to a transformer of this form heretofore. Opening the circuit breakers 20 and 20' opens the circuits between the rotary converters 10 and 10' and the secondary windings 19 and 19' respectively, but it is apparent that as one terminal of each of the secondary windings 19 and 19' are directly connected to the slip rings, that the voltage across the slip rings or the winding of the converters to ground may be dangerous to attendants working on the machine in the absence of any protective arrangement. In order to insure the machines being at ground potential when the breakers 20 and 20' are open I provide circuit breakers 21 and 21' for grounding the windings 12 and 12' of the rotary converters through current limiting resistances 22 and 22' in response to opening the circuit breakers 20 and 20' respectively. By this arrangement when the circuit breakers 20 and 20' are open attendants may work on the rotary converters in safety even though the converters are not entirely disconnected from the transformer 18.

The neutral conductor 15 of the three-wire direct current system is adapted to be connected to a neutral tap in one of the secondary windings 19 through circuit breaker 23, and the neutral conductor 15 is adapted to be connected to a neutral tap in one of the secondary windings 19' by circuit breaker 23'. Upon opening the circuit breakers 20 and 20' and grounding the windings 12 and 12' by the circuit breakers 21 and 21' it is apparent that as the neutral conductor 15 of the three-wire system is grounded that a circuit would be completed through a portion of the windings 19 and 19' having a neutral tap therein for the direct current system if the circuit breakers 23 and 23' did not open. This is avoided by mechanically connecting the circuit breakers 23 and 23' to the circuit breakers 20 and 20' respectively so that they are open and closed therewith. By this arrangement the circuit breakers 23 and 23' disconnect the neutral of the three-wire system from the neutral taps in the windings 19 and 19' when the circuit breakers 20 and 20' are open. Inasmuch as I employ circuit breakers 23 and 21 in addition to circuit breaker 20 it might seem that the actual saving in circuit breakers required over prior constructions is only one. However, in my improved system the breaker 23 is required to carry only current due to unbalance in the direct current system and the breaker 21 is required to carry only a very small current when the machine is grounded, so that the actual capacity of the breakers required is considerably less than that represented by two of the main circuit breakers which the breakers 23 and 21 replace.

Circuit breakers 20 and 23 are interlocked with the circuit breaker 21 so that the circuits through the secondary of the transformer 18 cannot be completed while the rotary converter 10 is grounded, and so that the circuit breaker 21 cannot be closed to ground the converter when the breaker 20 is closed connecting the secondary of the transformer 18 across the converter. This may be done in any convenient manner, but in the arrangement shown in the drawing the circuit breakers 20 and 21 are interlocked and controlled electrically by a switch 24 having an arm 24$^a$ adapted to engage contacts 24$^b$ and 24$^c$ thereof. The circuit breakers 20 are provided with a closing coil 25 which is adapted to be connected across low voltage conductors 26 through switch arm 24$^a$, contact 24$^b$, contacts 27 which are controlled by a contact arm 28 carried by circuit breaker 21, and conductor 29. The contact arm 28 is arranged so that the circuit between the closing coil 25 and conductor 29 is open until the circuit breaker 21 opens disconnecting the winding 12 from ground. The circuit breaker 21 is provided with a trip coil 30 which is arranged in a circuit between contact 24$^b$ and the conductor 29 so that the trip coil 30 is energized upon bringing the switch arm 24$^a$ into engagement with the contact 24$^b$ for closing the circuit breakers 20. The circuit breaker 21 is also provided with a closing coil 31 which is arranged to be connected across the low voltage conductors 26 through switch arm 24$^a$, contact 24$^c$, contacts 32 which are controlled by a contact arm 33 carried by the circuit breakers 20, and conductor 29. The contact arm 33 is arranged so that the circuit between the closing coil 31 and the contact 24$^c$ is open until the circuit breakers 20 open disconnecting the converter 10 from the transformer 18. The circuit breakers 20 are provided with a trip coil 34 which is arranged in a circuit between the contact 24$^c$ and the conductor 29 so that the trip coil 34 is energized upon bringing the switch arm 24$^a$ into engagement with the contact 24$^c$ for closing the circuit breaker 21. It will thus be seen that the circuit breakers 20 cannot be closed while the circuit breaker 21 is closed grounding the converter 10, and that the circuit breaker 21 cannot be closed to ground the converter until the circuit breakers 20 are opened so as to open the circuit between the converter and the secondary of the transformer 18. The circuit breakers 20' and 23' are interlocked with the circuit breaker 21' in the same manner as the circuit breakers 20 and 23 are interlocked with the circuit breaker 21, the parts for controlling these circuit breakers being indicated by the same numbers primed, and the arrangement will be readily understood from the description of the circuits used for controlling the circuit breakers 20 and 21.

In the operation of the system which I have described power is supplied to the rotary converters 10 and 10' from the alternating current mains 17 through the secondary windings 19 and 19' of the transformer 18. The rotary converters are provided with the usual starting windings (not shown) so that in starting the converters it is only necessary to close the circuit breakers 20 or 20' to bring them up to synchronous speed. In starting rotary converter 10, for example, the switch arm 24ᵃ is moved into engagement with the contact 24ᵇ so as to energize the closing coil 25 for the circuit breakers 20 and 23 and at the same time energize the trip coil 30 of the circuit breaker 21, the circuit to the closing coil 25 not being completed until the contact arm 28 carried by the circuit breaker 21 bridges the contacts 27, insuring that the machine is disconnected from ground.

After the machine reaches synchronous speed the shunt field of the field exciting winding 11 is energized and the direct current voltage of the machine is properly adjusted relative to the main conductors 13 and 14 of the three-wire direct current system, whereupon the circuit breakers 16 are closed so as to connect the rotary converter to the main conductors of the three-wire system. The rotary converter 10' is started in a similar manner and is connected to the direct current three-wire system by closing the circuit breakers 16'. In the event it becomes necessary to inspect or repair the converter 10 it is first disconnected from the direct current three-wire system after which the switch arm 24ᵃ is moved against the contact 24ᶜ so as to energize the trip coil 34 of the circuit breakers 20 and 23 for opening them. When the circuit breakers 20 and 23 are opened the contact arm 33 bridges the contacts 32 and completes a circuit through the closing coil 31 of the circuit breaker 21 which closes the circuit breaker 21 and grounds the winding 12 of the converter 10 through the resistance 22. The converter 10' may then be operated while the converter 10 is idle and the windings and slip rings of the rotary converter 10 will be at ground potential as the circuit breaker 21 is closed so that an attendant may work on the machine in safety although it is not entirely disconnected from the transformer. After the necessary repairs or adjustments are made the switch arm 24ᵃ is moved into engagement with the contact 24ᵇ which energizes the trip coil 30 of the circuit breaker 21 and completes the circuit between the low voltage control circuit 26 and the closing coil 25 which is energized and closes circuit breakers 20 and 23 as soon as the circuit breaker 21 opens and causes the contact arm 28 to bridge the contacts 27. The converter is brought up to synchronous speed by the starting winding and it is connected to the direct current system as previously described. It is apparent that the converter 10 can be operated in a similar manner while the converter 10' is being repaired or adjusted.

Although I have shown my invention as applied to a system of distribution including a double secondary transformer for supplying a plurality of rotary converters connected to a direct current system, I desire to be understood that my invention is not limited to the particular arrangement shown and described and may be applied to a system in which a single piece of electrical apparatus is employed, and I intend in the appended claims to cover all modifications which do not depart from the spirit and scope of my invention.

What I claim as new and desire to secure by Letters Patent of the United States, is,—

1. In combination with an electrical apparatus having an ungrounded winding comprising a plurality of terminals, an electrical circuit, one of the terminals of said winding being directly connected to said circuit, circuit controlling means for connecting another of said terminals to said circuit, and means for grounding said winding in response to disconnecting said last mentioned terminal only therefrom.

2. A system of electrical distribution including an alternating current transformer having a secondary winding comprising a plurality of independent sections in each phase, a plurality of dynamo-electric machines, each of said machines being provided with a winding connected directly to a terminal of one of said sections in each phase, circuit controlling means for connecting said winding across the one of said sections in each phase directly connected thereto, and means for grounding the winding of each of said machines in response to opening said circuit controlling means connecting the same across said sections.

3. A system of electrical distribution including an alternating current transformer having a secondary winding comprising a plurality of independent sections in each phase, a plurality of dynamo-electric machines, each of said machines being provided with a winding connected directly to a terminal of one of said sections in each phase, circuit controlling means for connecting said winding across the one of said sections in each phase directly connected thereto, and means including a current limiting resistance for grounding the winding of each of said machines in response to opening said circuit controlling means connecting the same across said sections.

4. A system of electrical distribution including an alternating current transformer having a secondary winding comprising a plurality of independent sections in each phase, a plurality of rotary converters, each of said rotary converters being provided with an armature winding connected directly to a terminal of one of said sections in each phase, a three-wire direct current system having the positive and negative main conductors thereof connected to the direct current side of said rotary converter and a grounded neutral conductor, circuit controlling means for connecting the armature windings of each of said converters independently of the other across the one of said sections in each phase of said transformer directly connected thereto and for connecting said neutral conductor to a neutral tap in the secondary of said transformer independently of the winding of the other converter, and means for grounding the winding of each of said machines independently of the other in response to opening said circuit controlling means connecting the same to the sections of said transformer.

In witness whereof, I have hereunto set my hand this 11th day of November, 1927.

THEOPHILUS F. BARTON.